(12) United States Patent
Yu et al.

(10) Patent No.: US 10,865,909 B2
(45) Date of Patent: Dec. 15, 2020

(54) VACUUM-KEEPING MULTISTAGE VACUUM-GENERATING AND VACUUM-DESTRUCTING VALVE

(71) Applicant: TAIWAN CHELIC CO., LTD., New Taipei (TW)

(72) Inventors: Ping-Cheng Yu, New Taipei (TW); Wei-Huan Yu, New Taipei (TW)

(73) Assignee: TAIWAN CHELIC CO., LTD., New Taipei (TW)

( * ) Notice: Subject to any disclaimer, the term of this patent is extended or adjusted under 35 U.S.C. 154(b) by 0 days.

(21) Appl. No.: 16/164,772

(22) Filed: Oct. 18, 2018

(65) Prior Publication Data

US 2019/0353279 A1    Nov. 21, 2019

(30) Foreign Application Priority Data

May 16, 2018 (TW) .............................. 107206364 U
May 16, 2018 (TW) .............................. 107206365 U
May 16, 2018 (TW) .............................. 107206366 U

(51) Int. Cl.
*F16K 51/02* (2006.01)
*F15B 13/08* (2006.01)
*F16K 27/00* (2006.01)

(52) U.S. Cl.
CPC .......... *F16K 51/02* (2013.01); *F15B 13/0839* (2013.01); *F15B 2211/89* (2013.01); *F16K 27/003* (2013.01); *Y10T 137/8667* (2015.04); *Y10T 137/86083* (2015.04)

(58) Field of Classification Search
CPC .. F16K 51/02; F16K 27/003; Y10T 137/8667; F15B 2211/89; F15B 13/0839
See application file for complete search history.

(56) References Cited

U.S. PATENT DOCUMENTS

2002/0144739 A1* 10/2002 Schnatterer ............... F04F 5/20
                                                           137/832
2003/0041646 A1*  3/2003 Tetreault ............ F02M 25/0809
                                                           73/1.58

* cited by examiner

*Primary Examiner* — Kevin R Barss
(74) *Attorney, Agent, or Firm* — Leong C. Lei

(57) ABSTRACT

A vacuum-keeping multistage vacuum-generating and vacuum-destructing valve includes a main body, which includes an introduction port, a vacuum port, a discharge port, and a vacuum-generating valve, in combination with a vacuum-destructing valve. The vacuum-destructing valve is arranged in combination with a flow conducting passage formed in the main body and connected to the vacuum port to allow a pressure fluid received through the introduction port to partly flow through the vacuum-destructing valve, and a vacuum-destructing two-port two-position valve is arranged in the flow conducting passage to increase flow rate of the pressure fluid passing therethrough to make a response of the vacuum port more sensitive in switching to a vacuum-destructing state. The ports of the main body are arranged in a detachable manner to increase service efficiency and ease part replacement. Two side seats are arranged to couple multiple such main bodies together to cope with complicated automatic processing operations.

8 Claims, 19 Drawing Sheets

VACUUM-KEEPING MULTISTAGE VACUUM-GENERATING AND VACUUM-DESTRUCTING VALVE

(a) TECHNICAL FIELD OF THE INVENTION

The present invention relates generally to a vacuum-keeping multistage vacuum-generating and vacuum-destructing valve, which has a main body in which a vacuum-destructing valve is arranged so that when an interior of the main body is set in a vacuum-generating state or a vacuum-keeping state, a vacuum-destructing two-port two-position valve that is arranged in a flow conducting passage connected between the vacuum-destructing valve and a vacuum port is operable to increase flow rate of a pressure fluid passing therethrough thereby making a speed of response of switching to a vacuum-destructing state more sensitive, and a reversal preventing valve is arranged between the vacuum port and a discharge port to allow, in a condition that the vacuum port generates a suction structure through vacuum, for an operation in combination the vacuum-generating valve stopping operation to set the vacuum port that is full of a negative pressure in a vacuum-keeping state, and the ports of the main body are arranged in a removable manner for removal and replacement to enhance an efficiency of repairing and servicing, and two side seats are provided for coupling and assembled with multiple main bodies to achieve the purpose of completing a more complicated automatic processing operations.

(b) DESCRIPTION OF THE PRIOR ART

A convention vacuum generation device (90), which can be referred to the vacuum generation device (90) shown in FIG. 17, comprises, in an interior thereof, an introduction port (901), a vacuum port (902), and a discharge port (903), the ports being interconnected through passages. The passages are provided with a vacuum-generating valve (906) and a vacuum-destructing valve (907). The introduction port (901) is provided for receiving a supply of pneumatic source (904) and the discharge port (903) is provided for discharging the pneumatic source (904). The vacuum port (902) is connectable to a suction mechanism.

When the pneumatic source (904) moves through the fluid passage (905) to pass through the operation of the vacuum-generating valve (906), an existing positive pressure is converted into a negative pressure, so that the vacuum port (902) generates a vacuum suction force as the suction mechanism. Also referring to FIG. 18, the vacuum-destructing valve (907) is generally provided with an inlet opening (9071) and an outlet opening (9072) for the pneumatic source (904) to flow therethrough. Under the condition that the vacuum generation device (90) is in a vacuum-generating state, in an attempt to release the vacuum, the pneumatic source (904) flowing into the inlet opening (9071) of the vacuum-destructing valve (907) drives a valve outlet port (9073) to have the pneumatic source (904) to discharge through the outlet opening (9072) thereby releasing the vacuum.

The flow rate that passes through the vacuum-destructing valve (907) in destructing vacuum is constrained to an area of the valve outlet port (9073). In addition, when the capacity of the vacuum generation device (90) is increased, the size of the vacuum-destructing valve (907) and those of other components must be increased by a lot.

Also referring to FIG. 19, the introduction port (901), the vacuum port (902), and the discharge port (903) of the vacuum generation device (90) are structured to receive connection plugs (91) to connect thereto and fix therein. The connection plug (91) is provided on an end thereof with a barbed fixing member (911). The barbed fixing member (911) comprises a barb (912) on an outside surface thereof for mating engagement with a through hole (913) formed in the vacuum generation device (90) for securely fixing and coupling. Such an arrangement of fixing has drawbacks. For example, when the barb (912) of the barbed fixing member (911) is set in completely tight engagement with the through hole (913), replacement of the connection plug (91) may not be available. In addition, an excessively large size of the barb (912) would cause undesired deformation at the coupling site, and on the other hand, an excessively small size of the barb (912) would reduce the strength of coupling. And, incorrectly assembling the connection plug (91) would make the entire plug damaged and disposed, leading to an increase of cost.

In addition, the automatic processing operations are becoming complicated, requiring more and more operation steps. The known vacuum generation device (90), as an individual and standalone device, cannot cope with practical requirements. Thus, later-available vacuum generation devices (90) are often structured to provide multiple functions. However, expansion devices that are currently available in the market, when used to combine and fix with the vacuum generation devices (90) as a unitary combination, suffer a limitation in the number of units that can be combined therewith and transmission wires are often randomly arranged, causing problems in operation and adjustment. In addition, to carry out fine adjustment, the adjustment must be individually carried out for each of the vacuum generation devices (90). Apparently, further improvements are required.

SUMMARY OF THE INVENTION

The present invention relates generally to a vacuum-keeping multistage vacuum-generating and vacuum-destructing valve, of which the primary technical objective is to provide an arrangement in which a vacuum-destructing two-port two-position valve is provided in a flow conducting passage, such that a flow supplied through a vacuum-destructing valve is driven again to make the flow for destructing vacuum not constrained by an existing vacuum-destructing valve, thereby making a response for destructing vacuum more sensitive, and in addition, a reversal preventing valve is arranged between the vacuum port and the discharge port and is operable, in a condition that the vacuum port generates a suction mechanism through vacuum, in combination with the vacuum-generating valve stopping operation, to make the vacuum port that is full of a negative pressure inducing and keeping vacuum.

A secondary technical objective is to provide a main body in which troughs are formed and each provided with insertion holes extending therefrom to a side surface of the main body, wherein a clip is insertable into the insertion holes to fit to and thus securely fix a connection plug in the trough so as to form a structure of a port and wherein the insertion holes are symmetrically arranged and are spaced from each other to allow the clip to readily fit therein and remove therefrom, allowing for easy replacement of the connection plug.

A further technical objective is to provide two side seats that are each provided with a side seat fluid introduction channel and a side seat discharge channel, and multiple main bodies being each provided with an introduction channel and a discharge channel each having two ends at which a raised face and a recessed face respectively formed such that the raised and recessed faces are matingly engageable with each other for connection and expansion to allow the introduction channels and the discharge channels of the multiple main body to be closely connected, wherein a pressure fluid is allowed to flow from the side seat fluid introduction channel through the introduction channels and the discharge channels to the side seat discharge channel, the two side seats being provided with a plurality of bolt holes, through which fixing bolts are receivable and extending through holes formed in the multiple main bodies for securely fixing the multiple main bodies to the two side seats, and the two side seats are further provided with a connection port for data transmission with an external device.

The present invention provides a vacuum-keeping multi-stage vacuum-generating and vacuum-destructing valve, which is formed of a main body, which comprises an introduction port, a vacuum port, a discharge port, and a vacuum-generating valve, in combination with a vacuum-destructing valve. The vacuum-destructing valve is arranged in a flow conducting passage formed in the main body and connected to the vacuum port so that a pressure fluid received through the introduction port is allowed to partly flow through the vacuum-destructing valve, and a vacuum-destructing two-port two-position valve is provided in the flow conducting passage to increase flow rate of the pressure fluid flowing therethrough and thus making a response of the vacuum port more sensitive in switching to vacuum destruction. The main body is provided with a plurality of troughs. The troughs are each provided with insertion holes formed in an inside wall thereof and extending to a side surface of the main body. A connection plug is combined with a connection plug clip seat to form a unitary structure. The connection plug clip seat is provided, on a circumference thereof, with a clip groove, so that when the connection plug is disposed in the trough, the insertion holes and the clip groove are in alignment with each other. A clip is fit into and fixed in the insertion holes to securely fix the connection plug in the main body. The clip is removable from the insertion holes for detachment of the connection plug for replacement. Additionally, two side seats are provided and define a receiving space to which multiple main bodies therebetween for connection and fixed thereto. The two side seats are each provided with a side seat fluid introduction channel and a side seat discharge channel. The main bodies are each provided with an introduction channel and a discharge channel, and each of the channels is provided with a raised face and a recessed face, so that mating engagement between the recessed and raised faces allows for connection and expansion to be achieved, so that the introduction channels and the discharge channels of the main bodies are respectively set in tight connection with each other, allowing a pressure fluid to flow from the side seat fluid introduction channel through the introduction channels and the discharge channels to the side seat discharge channel.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
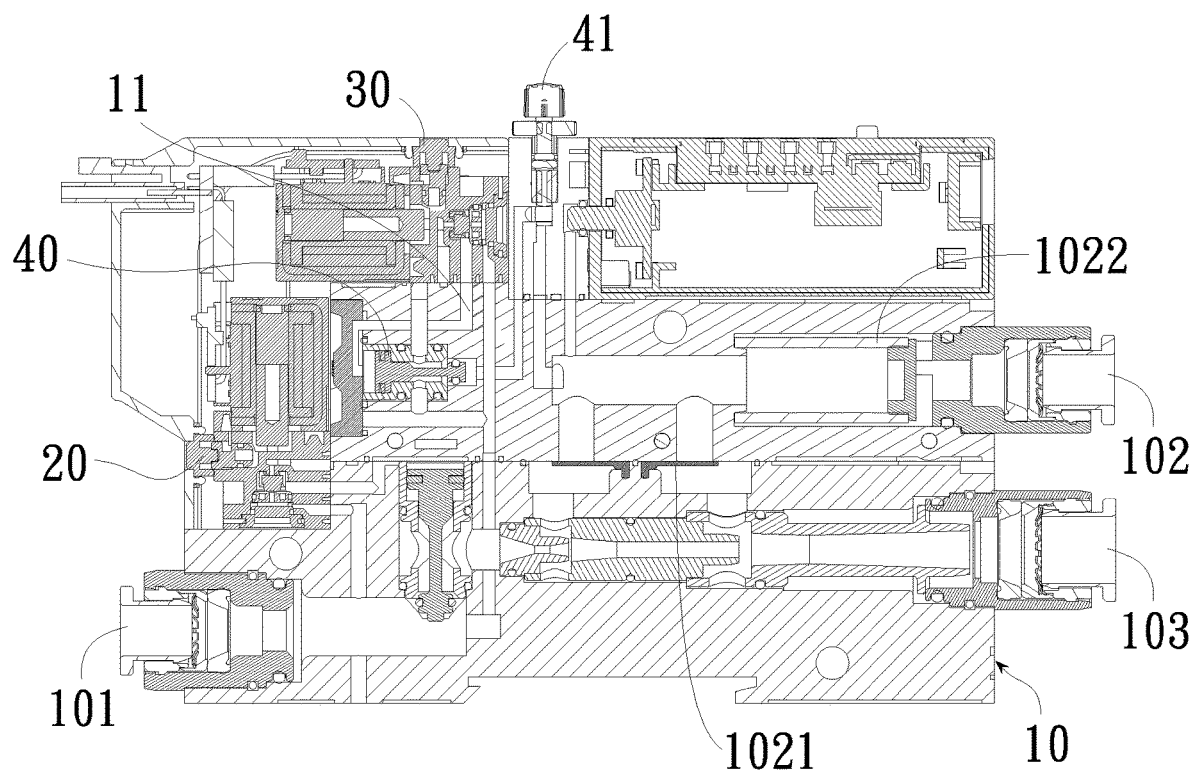
FIG. 1 is a schematic view illustrating a structure of the present invention in a standby state.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

The present invention provides a vacuum-keeping multi-stage vacuum-generating and vacuum-destructing valve, of which a preferred feasible embodiment will be described in detail with reference to FIGS. 1-16, in order to provide a better understanding to the present invention, of which a structure comprises: a main body (10), which comprises an introduction port (101) to which a pressure fluid (P) may be connected, a vacuum port (102) that can be connected to a suction mechanism, a discharge port (103) that discharges the pressure fluid (P) supplied through the introduction port (101) to the outside, and a vacuum-generating valve (20) that generates a negative pressure (PB) under a condition of being acted upon by the pressure fluid (P) supplied through the introduction port (101). The suction mechanism, which can be for example a suction pad, provides a function of conveyance in a condition of keeping attaching through suction and also provides a function of cancelling the suction condition by destructing vacuum so as to convey a work piece attached to or including the suction mechanism to a desired location and release at the location.

A vacuum-destructing valve (30) is arranged and operated in combination with a flow conducting passage (11) that is formed in an interior of the main body (10) and connected to the vacuum port (102) to allow the pressure fluid (P) supplied through the introduction port (101) to partly flow through the vacuum-destructing valve (30). The flow conducting passage (11) is provided therein with a vacuum-destructing two-port two-position valve (40), which is generally arranged posterior to the vacuum-destructing valve (30), so that the pressure fluid (P), after passing through the vacuum-destructing valve (30), enters the vacuum-destructing two-port two-position valve (40) to help increase flow rate of the pressure fluid (P) so as to make a response of the vacuum port (102) more sensitive in switching to a vacuum-destructing state.

As shown in FIG. 1, a number of passages/channels and components are arranged among the introduction port (101), the vacuum port (102), the discharge port (103) in the interior of the main body (10) and are interconnected to allow the pressure fluid (P) to change from a positive pressure (PA) to a negative pressure (PB), in order to provide the functionality of a suction mechanism.

Figure 2:
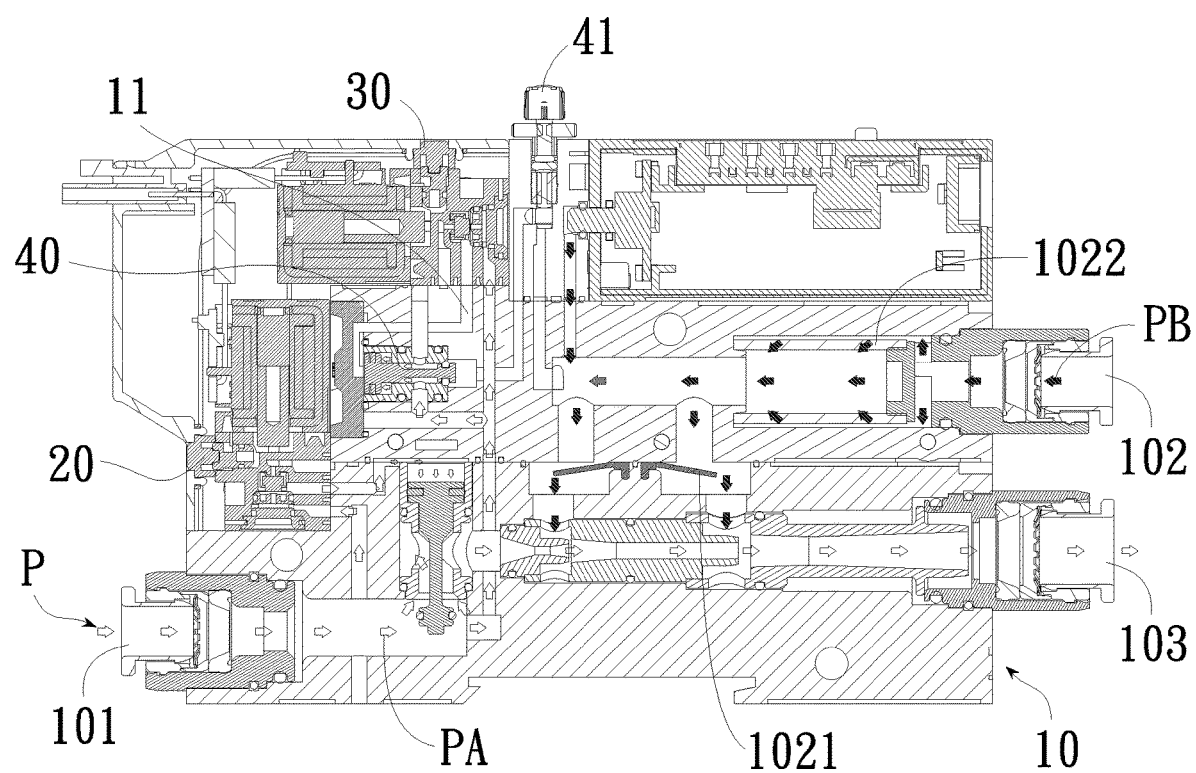
FIG. 2 is a schematic view illustrating the structure of the present invention in a vacuum-generating state.

Referring to FIG. 2, the pressure fluid (P), when supplied and introduced in through the introduction port (101), moves through the interior to reach the vacuum-generating valve (20) and the vacuum-destructing valve (30), both of which are or involve electromagnetic valves that are each provided with an inlet opening and an outlet opening. A portion of the pressure fluid (P), after passing through the vacuum-generating valve (11), follows the passages to flow toward the discharge port (103) and is maintained as a positive pressure (PA) during such a process, and is then converted into a negative pressure (PB) in passing through the discharge port (103), so that a vacuum suction force is induced in the vacuum port (102), while a portion of the pressure fluid (P) that flows to the inlet opening of the vacuum-destructing valve (30) is stopped and is not further moved, whereby the vacuum port (102) may generate or function or act on a suction mechanism.

Figure 3:
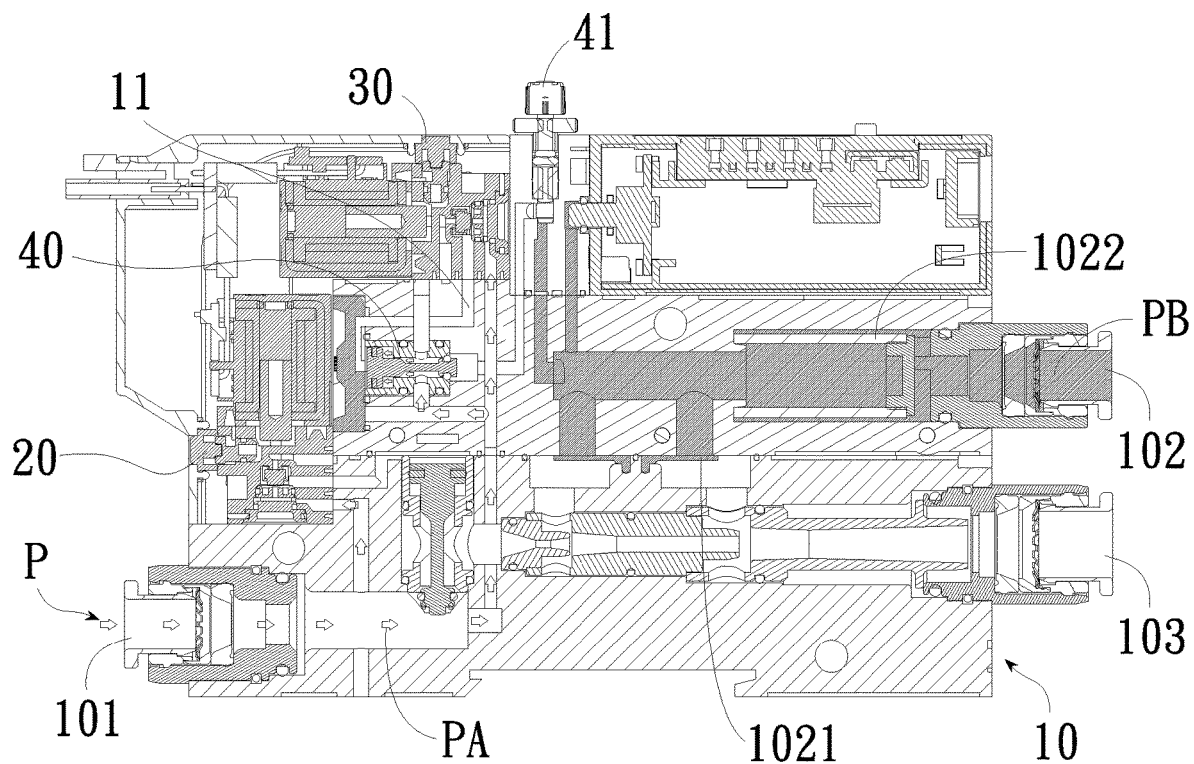
FIG. 3 is a schematic view illustrating the structure of the present invention in a vacuum-keeping state.

Referring to FIG. 3, after the generation of vacuum has been completed as described above, the inlet opening of the vacuum-generating valve (20) is closed to prevent the pressure fluid (P) from further flowing in the main body (10) and in addition, a reversal preventing valve (1021) is arranged between the vacuum port (102) and the discharge port (103), so that under the condition that no positive pressure (PA) is passing through the discharge port (103) for further discharging, the reversal preventing valve (1021) is closed so that the vacuum port (102) maintains the condition of the suction mechanism, this being a vacuum-keeping state.

Figure 4:
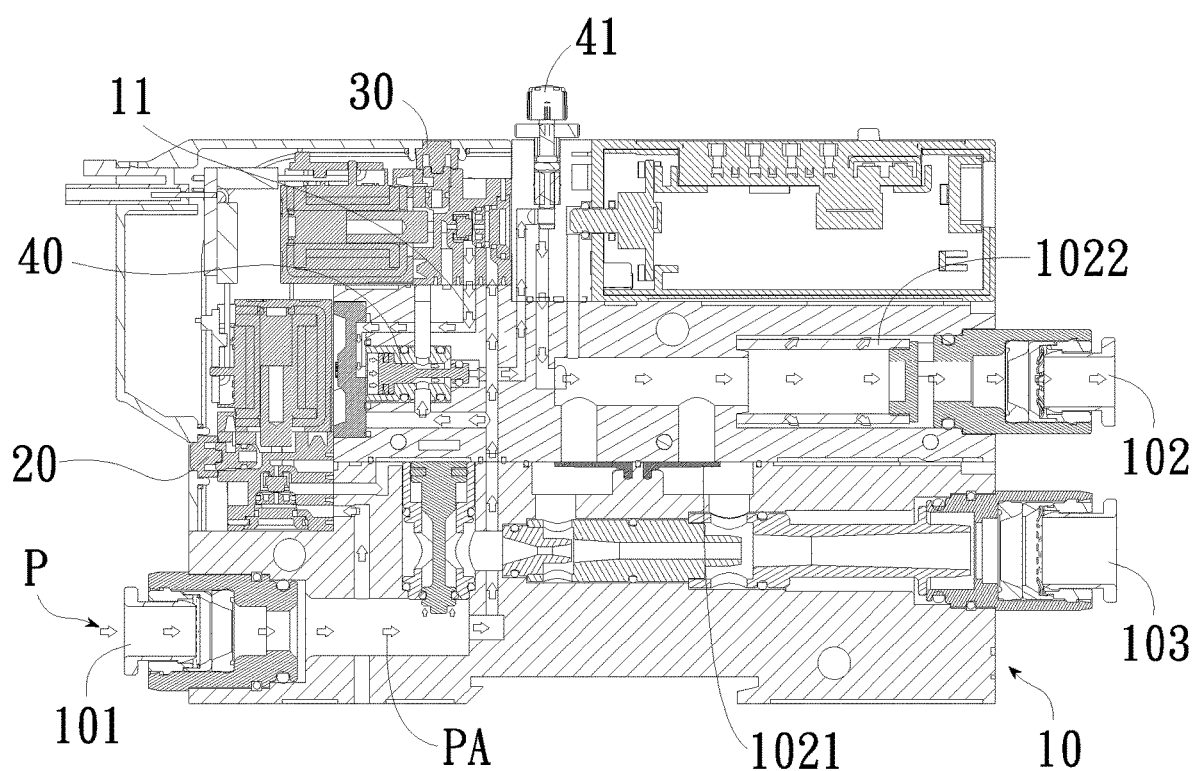
FIG. 4 is a schematic view illustrating the structure of the present invention in a vacuum-destructing state.
Figure 5:
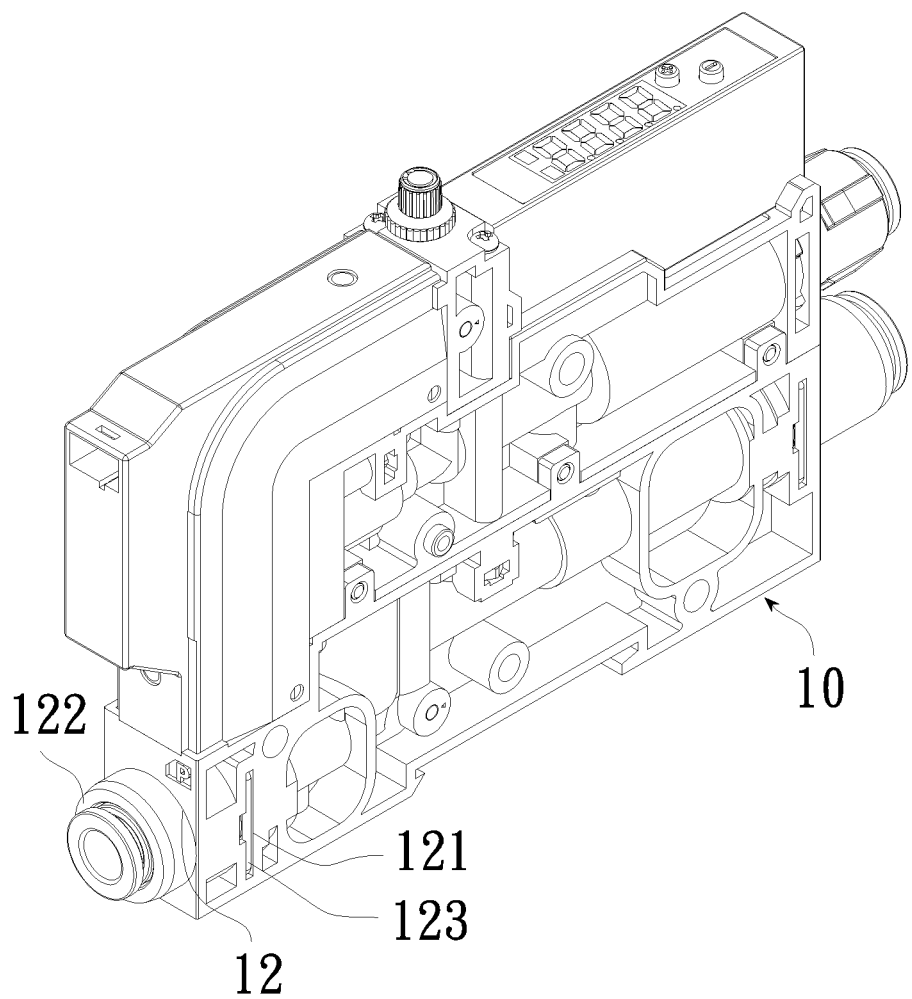
FIG. 5 is a perspective view illustrating the present invention.
Figure 6:
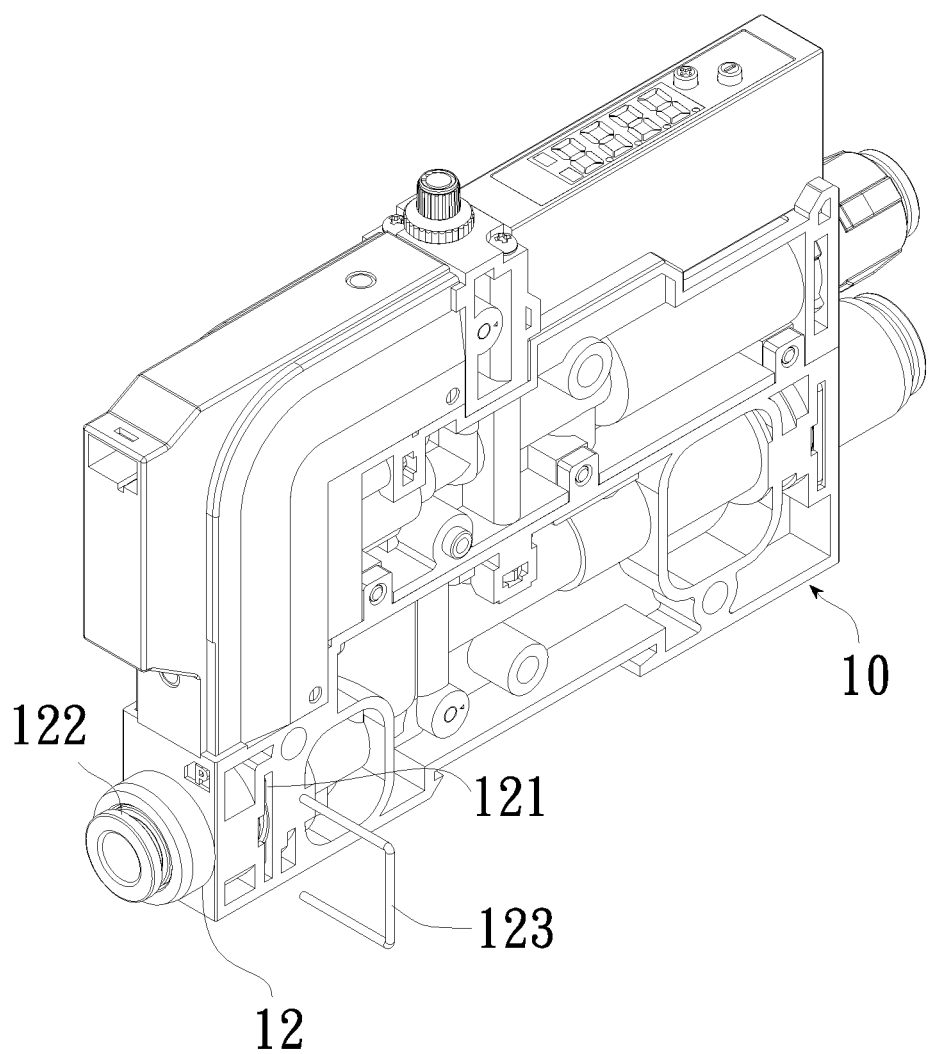
FIG. 6 is a perspective view illustrating a clip being removed from the structure of the present invention.
Figure 7:
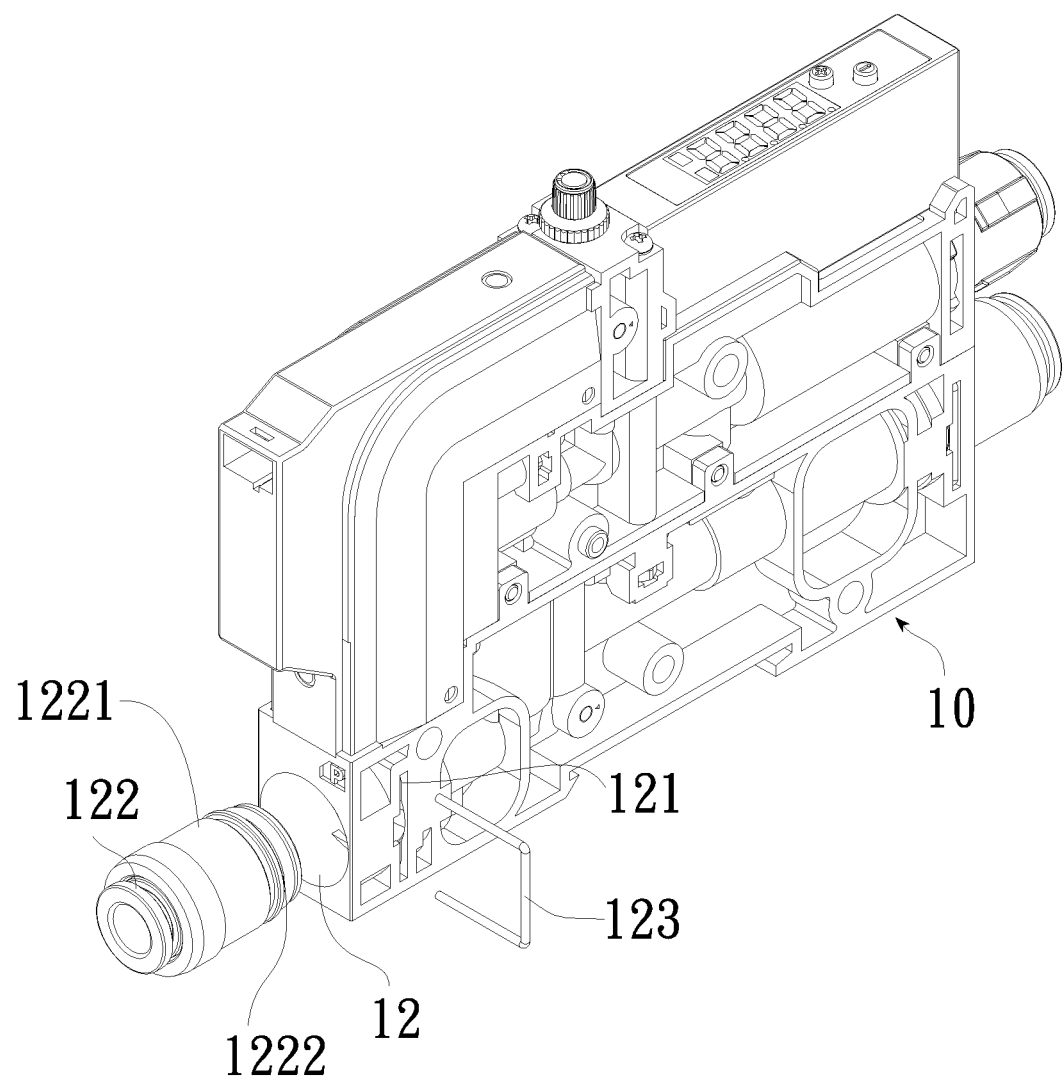
FIG. 7 is a perspective view illustrating removal and replacement of a connection plug of the structure of the present invention.
Figure 8:
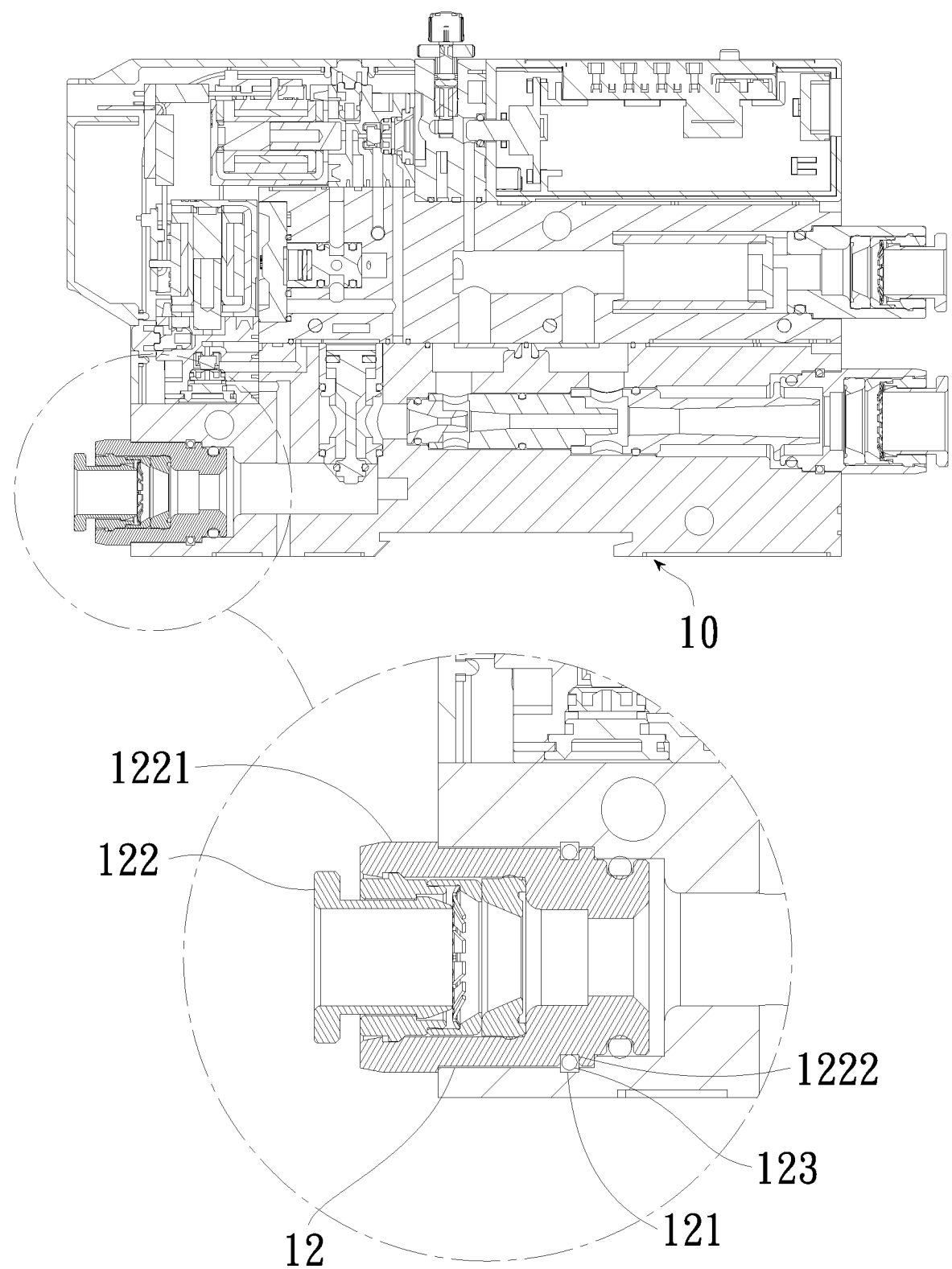
FIG. 8 is a cross-sectional view illustrating the structure of the present invention, a circled portion being separately shown in an enlarged form.
Figure 9:
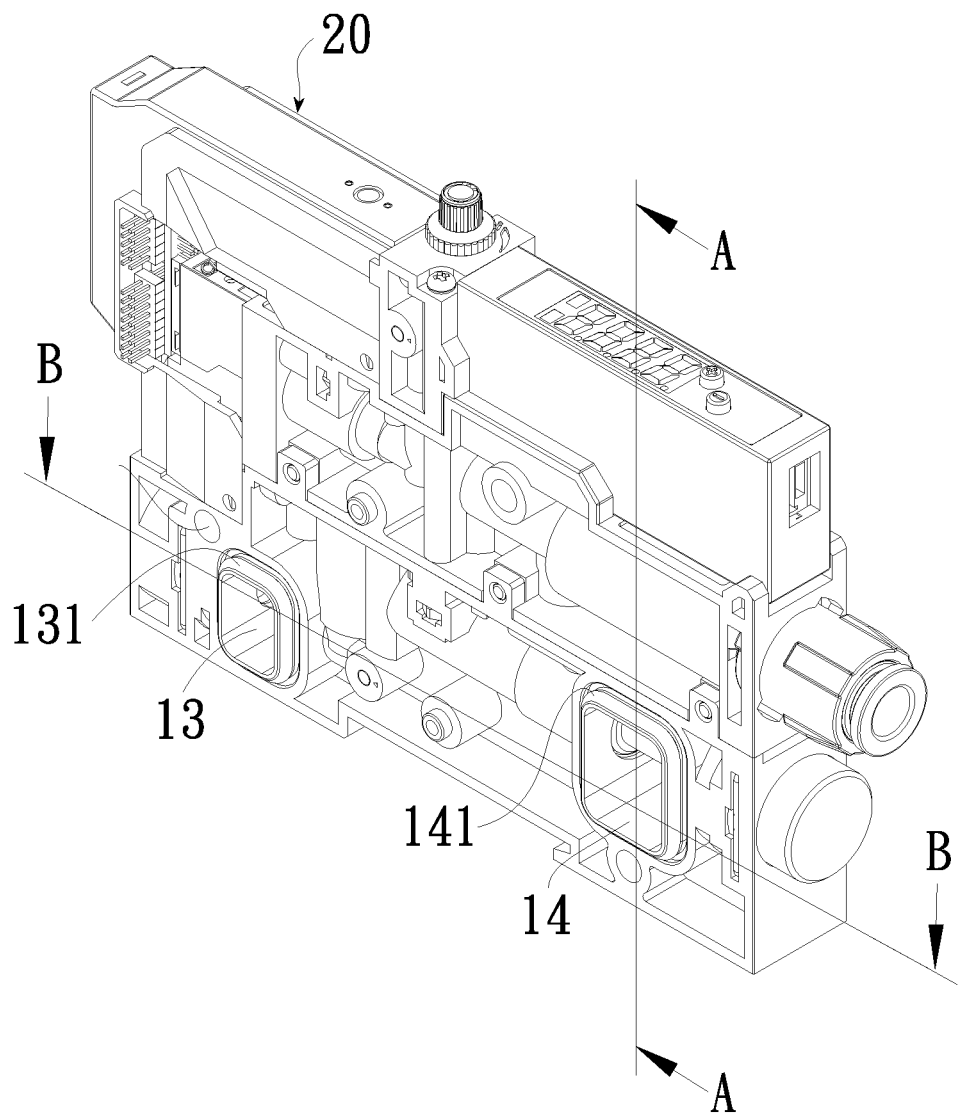
FIG. 9 is a perspective view illustrating an alternative structure of the present invention arranged as an individual unit.
Figure 10:
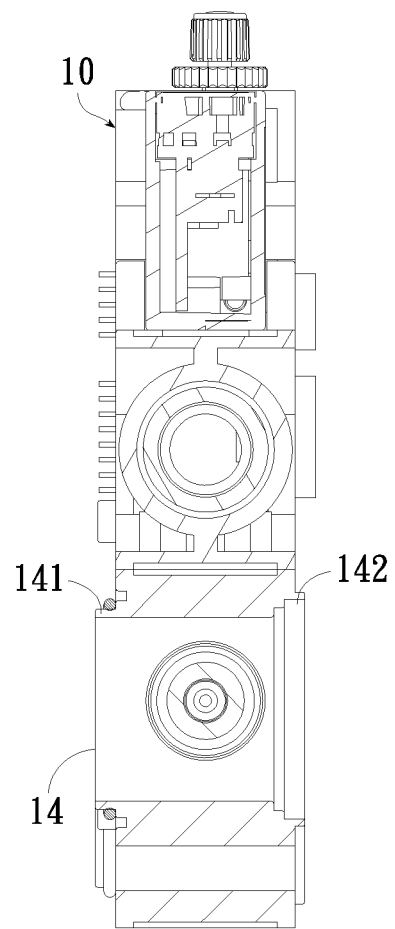
FIG. 10 is a cross-sectional view of the present invention, in an enlarged form, taken from line A-A of FIG. 9.
Figure 11:
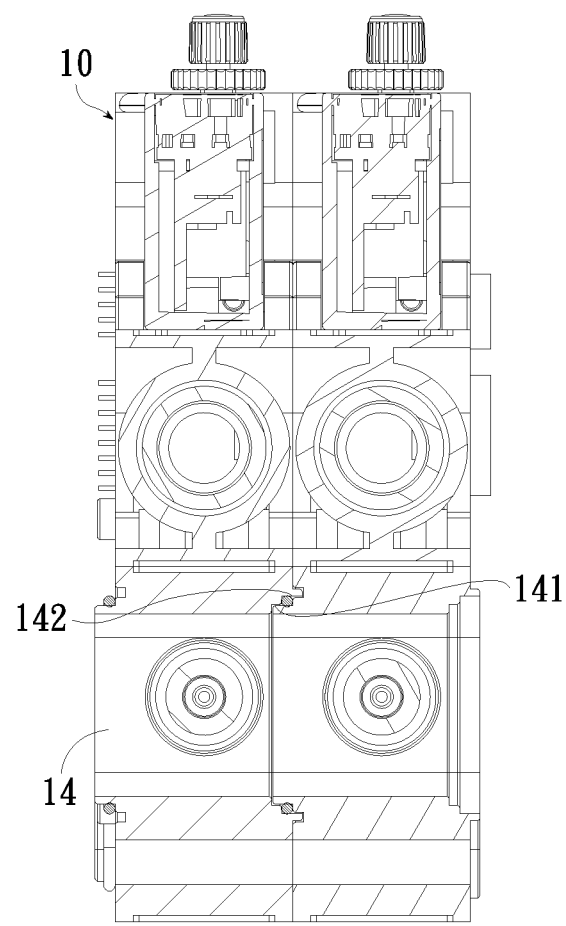
FIG. 11 is a schematic view illustrating multiple units of the present invention as shown in FIG. 10 combined together.
Figure 12:
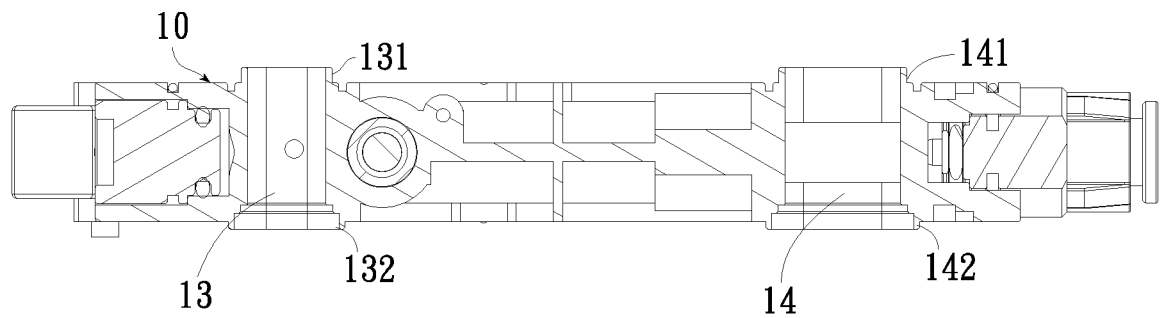
FIG. 12 is a cross-sectional view of the present invention, in an enlarged form, taken from line B-B of FIG. 9.
Figure 13:
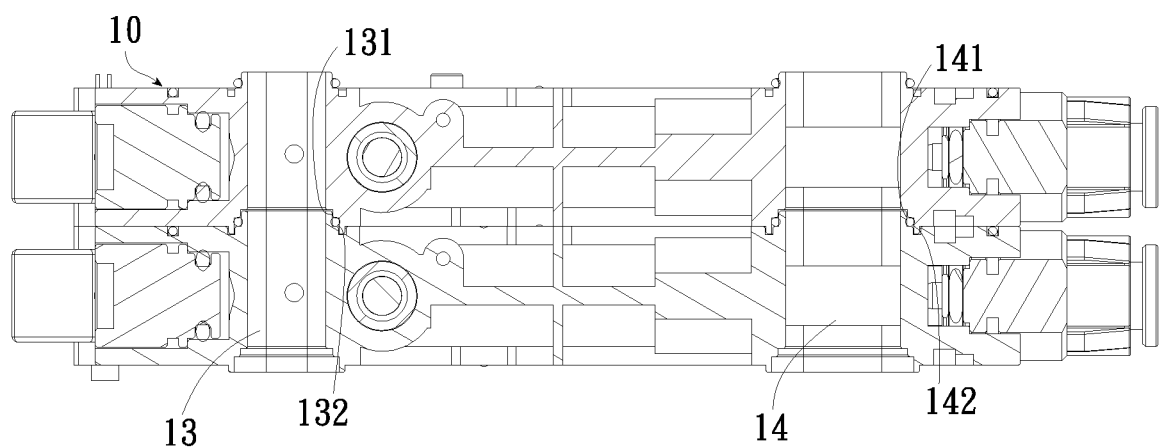
FIG. 13 is a schematic view illustrating multiple units of the present invention as shown in FIG. 12 combined together.
Figure 14:
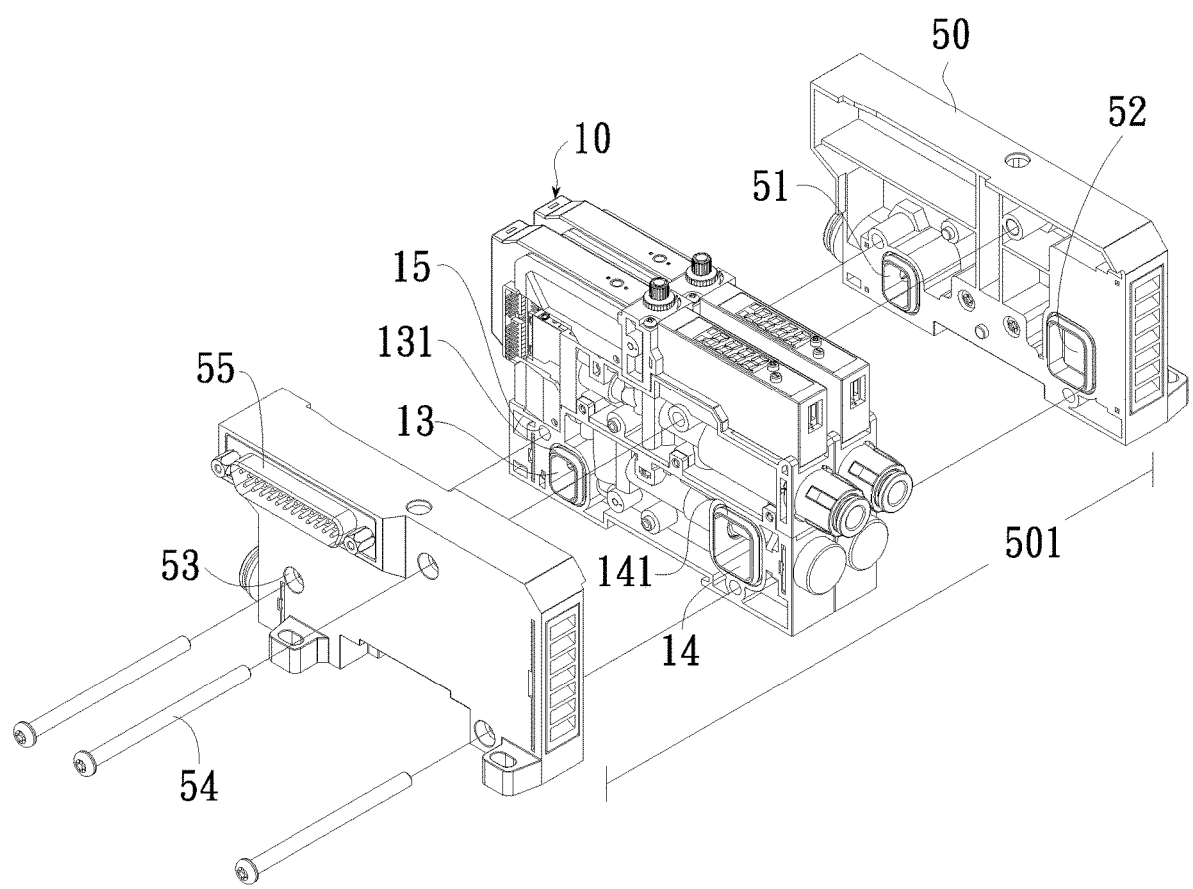
FIG. 14 is a schematic view illustrating assembling of the present invention.
Figure 15:
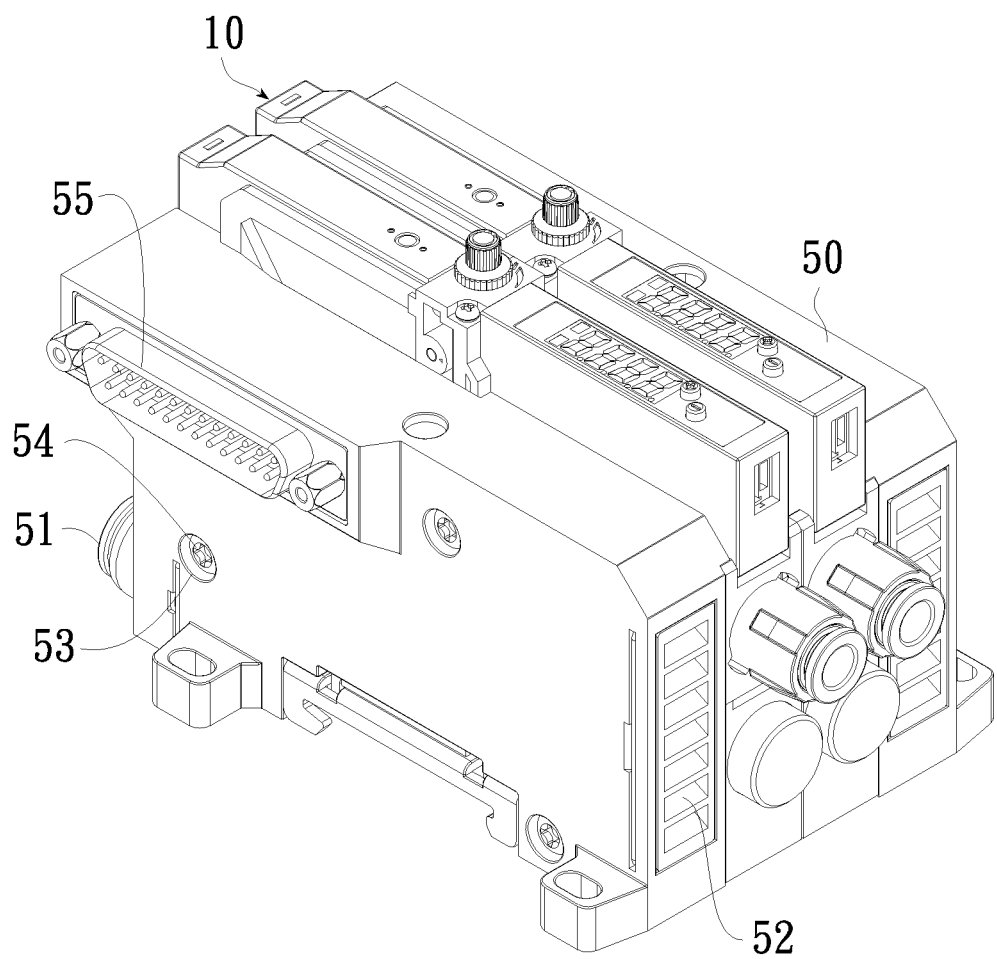
FIG. 15 is a schematic view illustrating the present invention in a completely assembled form.
Figure 16:
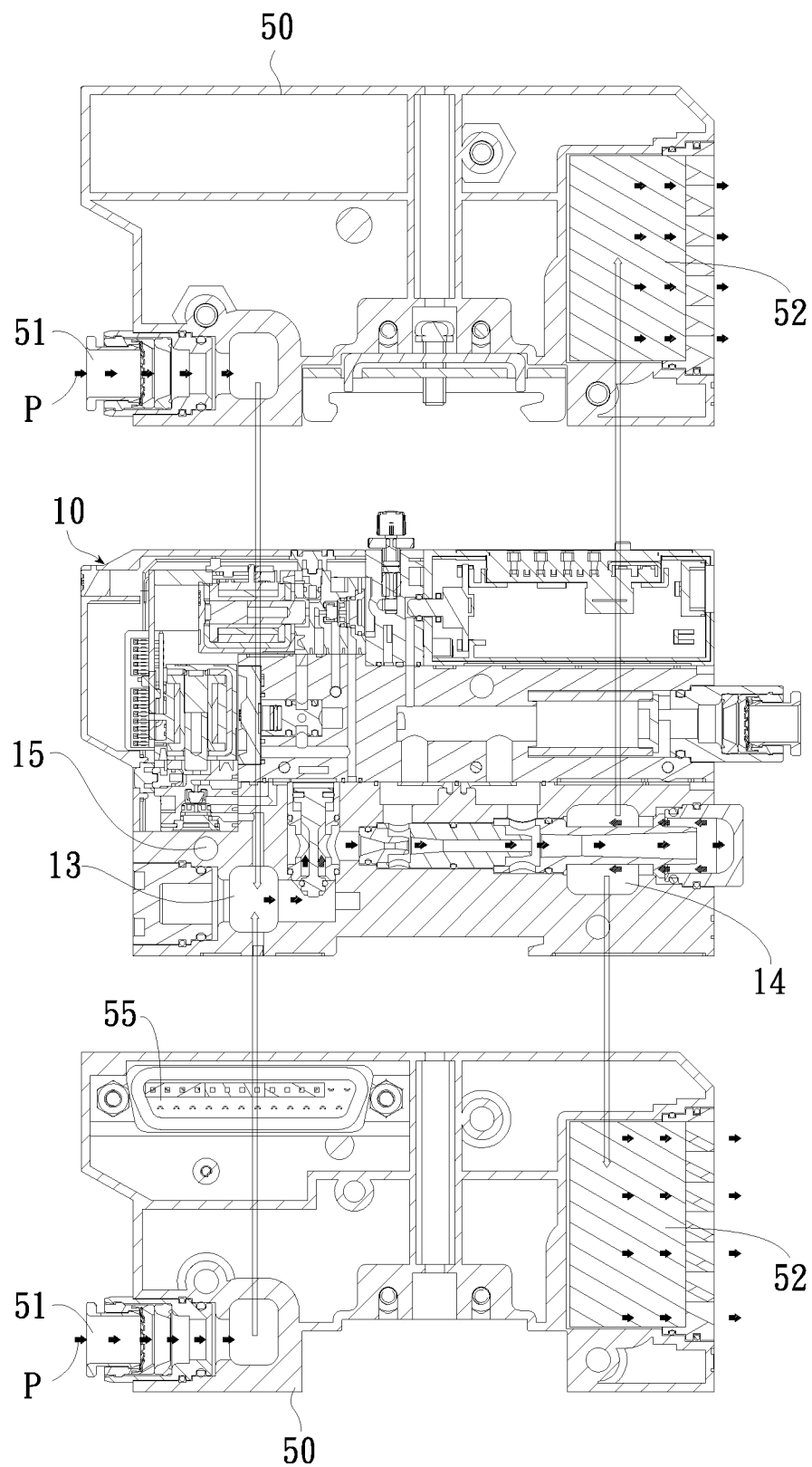
FIG. 16 is a schematic view illustrating flow of pressure fluid in an expansion device of the present invention.
Figure 17:
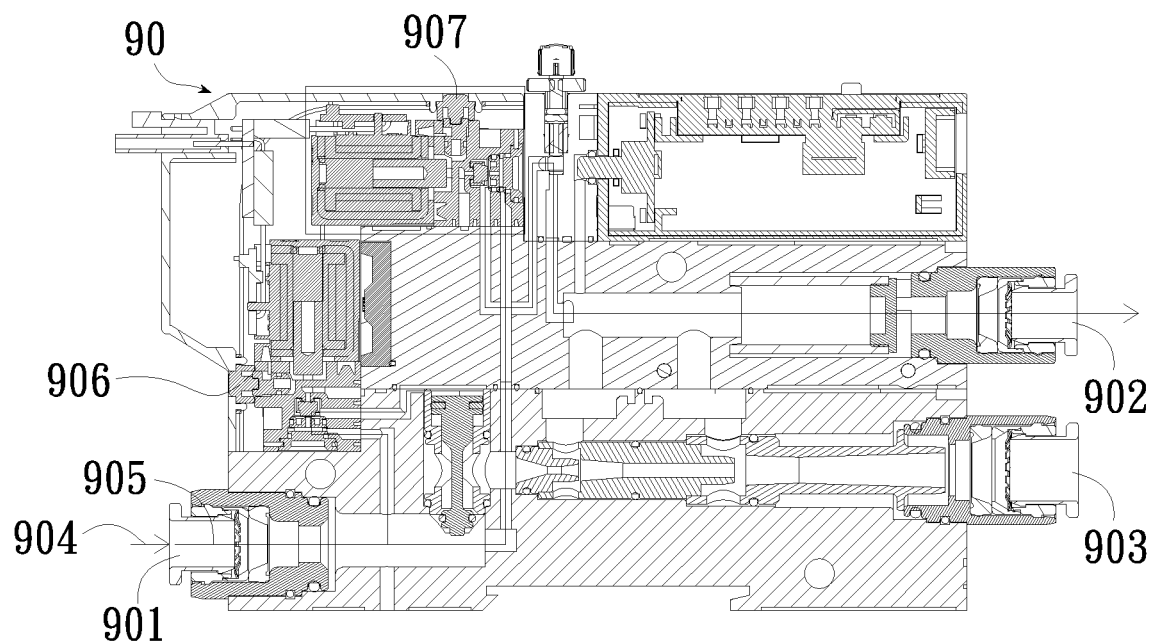
FIG. 17 is a schematic view illustrating a known structure.
Figure 18:
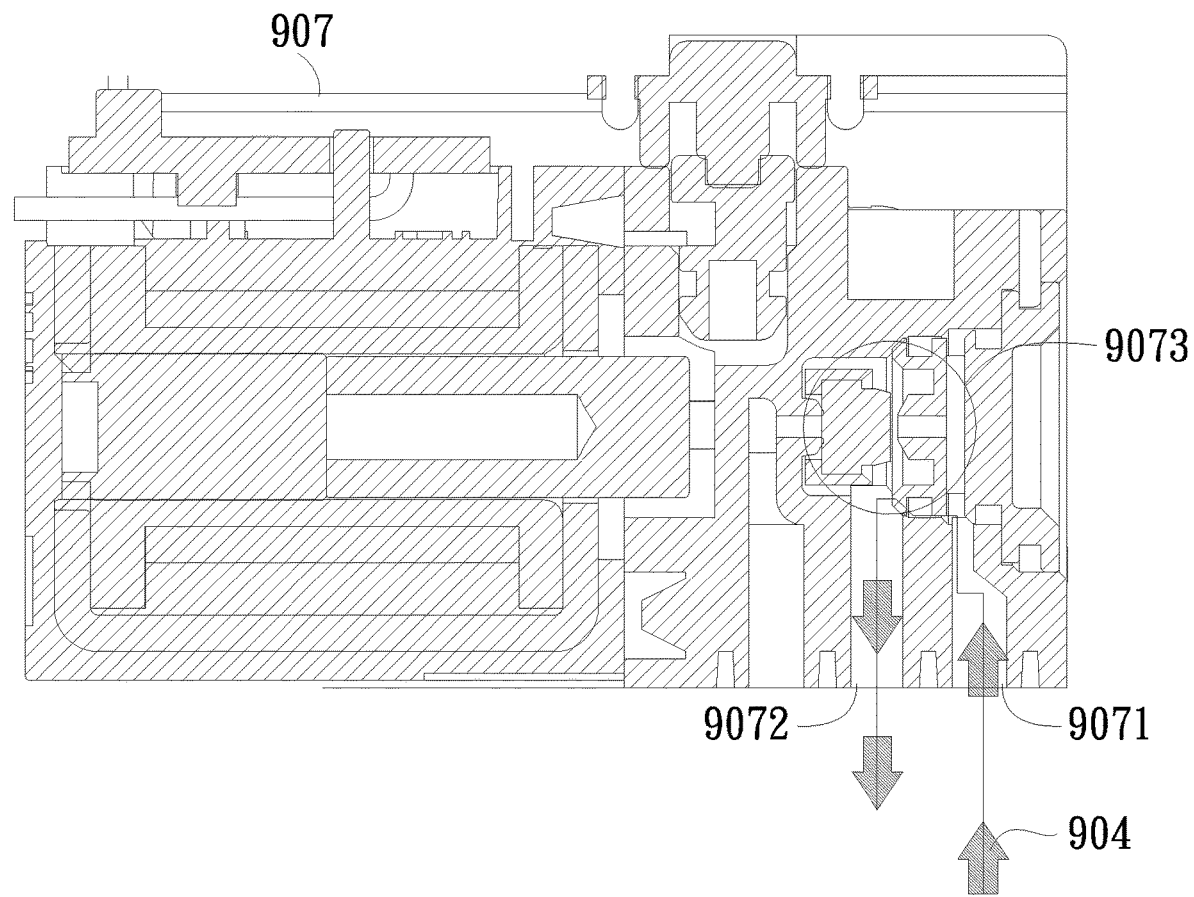
FIG. 18 is a schematic view illustrating a portion of the structure of FIG. 17 is an enlarged form.
Figure 19:
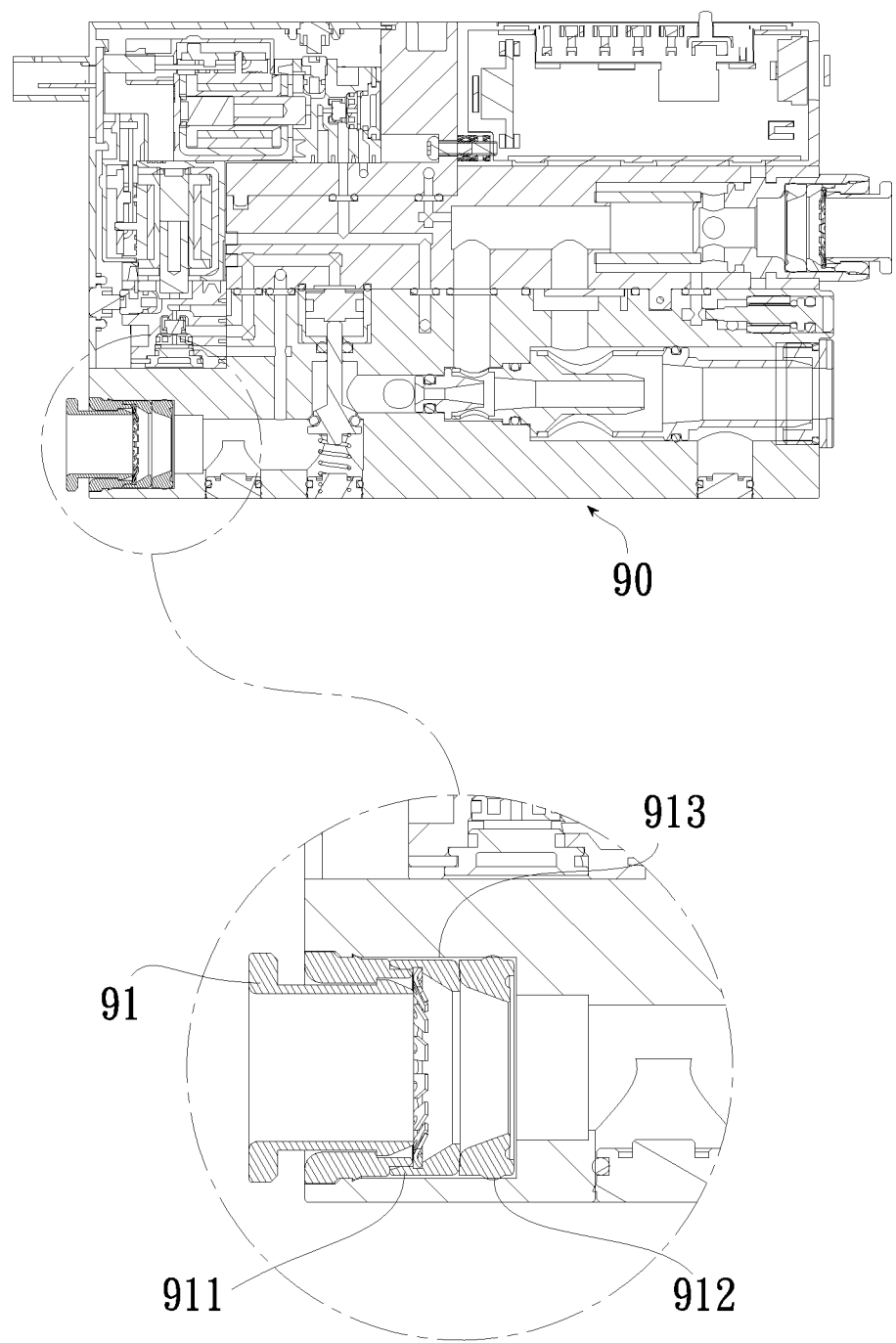
FIG. 19 is a schematic view illustrating the known structure with a circled portion being shown separately in an enlarged form.

Referring to FIG. 4, to release the vacuum-keeping state, the inlet opening of the vacuum-destructing valve (30) is opened to allow the pressure fluid (P) to flow through the interior thereof toward the outlet opening to be discharged therefrom. The flow conducting passage (11) is a channel or a passage that extends from the outlet opening of the vacuum-destructing valve (30) to the vacuum port (102). Thus, the fluid is subsequently flows along the flow conducting passage (11) to the vacuum port (102) to discharge a positive pressure (PA) to destruct the vacuum and thus release the suction mechanism.

A destruction adjusting knob (41) is additionally provided between the flow conducting passage (11) and the vacuum port (202) and more specifically, is located posterior to the vacuum-destructing two-port two-position valve (40), for the purpose of controlling the flow rate of the pressure fluid (P) passing through the two-port two-position valve (21). The vacuum port (102) may be additionally provided with a vacuum filter (1022) for removing dust powders from the fluid.

Referring to FIGS. 5-9, the main body (10) is provided with a plurality of troughs (12), and the troughs (12) provide and define the locations where the introduction port (101), the vacuum port (102), and the discharge port (103) are set. Each of the troughs (12) is provided in a sidewall thereof with insertion holes (121), and the insertion holes (121) are arranged to extend to a side surface of the main body (10). A connection plug (122) is provided and is combined with a connection plug clip seat (1221) as an integrated body. The connection plug clip seat (1221) is provided on an outside circumference thereof with a clip groove (1222). When the connection plug (122) is combined with the connection plug clip seat (1221) to be collectively disposed into each of the troughs (12), the insertion holes (121) and the clip groove (1222) are in alignment with each other to allow a clip (123) to be fit into the insertion holes (21) to have the connection plug (122) securely fixed in the main body (10); and when the clip (123) is removed from the insertion holes (121), the connection plug (122) is allowed to detach for replacement with a new one having a different bore size. The insertion holes (121) are arranged symmetric and the clip (123) is of a U-shape, which is insertable into the insertion hole (121) by setting a spacing distance between limbs of the U-shape of the clip (123) to correspond to a spacing distance of the insertion holes (121), so that the clip (123) and the insertion holes (121) can be set in a tighter engagement with each other.

Additionally or alternatively, two side seats (50) are provided and are arranged at left and right sides in a horizontal direction and the two side seats (50) are each provided with a side seat introduction channel (51) and a side seat discharge channel (52) to receive a supply of the pressure fluid (P) fro the outside. The two side seats (50) define therebetween a receiving space (501) in which multiple main bodies (10) may be arranged and fixed.

Each of such multiple main bodies (10) is additionally or alternatively provided with an introduction channel (13), a discharge channel (14), and a plurality of through holes (15). The introduction channel (13) has two opposite ends at which a raised face (131) and a recessed face (132) are respectively formed. The discharge channel (14) has two ends at which a raised face (141) and a recessed face (142) are respectively formed. To assemble the multiple main bodies (10), as viewed in the cross-sections taken along lines A-A and B-B of FIG. 9, the introduction channels (13) and the discharge channels (14) are coupled to each other for expansion and extension as the recessed faces (132, 142) and the raised faces (131, 141) match and engage with each other. The recessed faces (132, 142) and the raised faces (131, 141) are provided with rubber rings or the likes for sealing so that leaking of the pressure fluid (P) at the connections of the introduction channels (13) and the discharge channels (14) is prevented.

The two side seats (50) are further provided with a plurality of bolt holes (53). The bolt holes (53) are arranged to correspond, in position, to the through holes (15) of the main body (10). With a desired number of main bodies (10) are provided between the side seats (50), fixing bolts (54) are provided to extend through the through holes (15) to securely fix the side seats (50) and the main bodies (10) together.

Referring to FIGS. 10-16, when the side seats (50) and the main bodies (10) are securely combined together, the pressure fluid (P), in introduction into the side seat fluid introduction channel (51), can supplied from one side or two sides of the combination of the side seats (50) and the pressure fluid (P) will move through the introduction channels (13) of the main bodies (10) to the discharge channels (14) for further flowing through the discharge channel (14) to the side seat discharge channels (14) to be discharged therefrom. The side seats (50) are provided on a surface thereof with a connection port (55) for connection with an external device for transmission of data so that adjustment of the multiple main bodies (10) can be carried out more easily.

In summary, the present invention provides an arrangement in which a vacuum-destructing valve (30) is arranged in combination with a flow conducting passage (11) in which a vacuum-destructing two-port two-position valve (40) is additionally provided to allow a pressure fluid (P) passing through the vacuum-destructing valve (30) to subject to an increase of flow rate of the pressure fluid (P) by means of the vacuum-destructing two-port two-position valve (40) thereby making a response to vacuum destruction more sensitive. In addition, a reversal preventing valve (1021) is further arranged between a vacuum port (102) and a discharge port (103) to maintain a state of vacuum suction mechanism for a predetermined period of time for operation without additional supply of pressure fluid (P). A main body (10) is structured such that a plurality of troughs (12) are formed and a clip groove (1222) is formed in a connection plug clip seat (1221), wherein a connection plug (122) is disposed in each of the troughs (12) and insertion holes (121) and the clip groove (1222) are in alignment with each other to ease coupling made with a clip (123) thereby securing fixing the connection plug (122) in the main body (10), whereby the connection plug (122) is made replaceable according to requirements and problems associated with insufficiency of structural strength and easiness of deformation can be overcome. In addition two side seats (50) are provided for coupling multiple main bodies (10) together, wherein side seat fluid introduction channels (51) and side seat discharge channels (52) formed in the side seats (50) are connectable with introduction channels (13) and discharge channels (14) of the main bodies to allow the pressure fluid (P) supplied through the two side seats (50) to be used to drive multiple main bodies (10), to achieve the purposes of more complicated vacuum suction operations or automatic programmable control, without being constrained to the number of the main bodies (10) that are allowed for installation, making the application thereof more flexible.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A vacuum-keeping multistage vacuum-generating and vacuum-destructing valve, comprising: a main body, which comprises an introduction port to which a pressure fluid is connected, a vacuum port adapted to connect to a suction mechanism, a discharge port through which the pressure fluid supplied through the introduction port is discharged to outside, and a vacuum-generating valve that when opened allows a negative pressure to be generated through the pressure fluid being supplied through the introduction port, wherein a vacuum-destructing valve is operable in combination with a flow conducting passage formed in the main body and connected to the vacuum port to allow the pressure fluid supplied through the introduction port to partly flow through the vacuum-destructing valve, and a vacuum-destructing two-port two-position valve is arranged in the flow conducting passage to increase flow rate of the pressure fluid passing therethrough to make a response of the vacuum port more sensitive in switching to a vacuum-destructing state; a reversal preventing valve is arranged between the vacuum port and the discharge port, which, when the vacuum port is in a condition of generating suction through vacuum, is closed when the vacuum-generating valve is closed, to allow the vacuum port to be full of negative pressure maintaining a vacuum-keeping state.

2. The vacuum-keeping multistage vacuum-generating and vacuum-destructing valve according to claim 1, wherein the flow conducting passage further comprises a destruction adjusting knob, which operates the vacuum-destructing two-port two-position valve to control flow rate through the valve.

3. The vacuum-keeping multistage vacuum-generating and vacuum-destructing valve according to claim 1, wherein the main body further comprises a vacuum filter, which is arranged in the vacuum port, the vacuum filter being operable to remove dust powders contained in the fluid flowing into the vacuum port.

4. The vacuum-keeping multistage vacuum-generating and vacuum-destructing valve according to claim 1, wherein the main body further comprises a plurality of troughs, the troughs each having an inside wall in which insertion holes are formed and extend to a side surface of the main body; and a connection plug, which is combined with a connection plug clip seat to create a unitary structure with the body, the connection plug clip seat having a circumference in which a clip groove is formed, so that the connection plug is disposable in the trough to have the insertion holes and the clip groove in alignment with each other, a clip being insertable and fixed in the insertion holes to fix the connection plug in the main body, the clip being selectively removable from the insertion holes to allow for detachment of the connection plug.

5. The vacuum-keeping multistage vacuum-generating and vacuum-destructing valve according to claim 4, wherein the insertion holes are symmetrically arranged and are spaced from each other.

6. The vacuum-keeping multistage vacuum-generating and vacuum-destructing valve according to claim 1, further comprising two side seats, which are each provided with a side seat fluid introduction channel and a side seat discharge channel and are arranged to allow multiple units of the main body to be coupled and installed, the multiple main bodies being each further provided with an introduction channel, a discharge channel, and a plurality of through holes, the introduction channel and the discharge channel each having two ends that are provided with a raised face and a recessed face, respectively, wherein the introduction channels and the discharge channels are connectable and expandable through coupling between the recessed faces and the raised faces, respectively, so that the pressure fluid is receivable through the side seat fluid introduction channel to flow through the introduction channels and the discharge channels into the side seat discharge channel.

7. The vacuum-keeping multistage vacuum-generating and vacuum-destructing valve according to claim 6, wherein the two side seats further comprise a plurality of bolt holes, through which fixing bolts are receivable and extending through the through holes to fix the main bodies and the two side seats together.

8. The vacuum-keeping multistage vacuum-generating and vacuum-destructing valve according to claim 6, wherein the two side seats further comprise a connection port provided on a surface of the two side seats and adapted to electrically connect with an external device for transmission of data.

\* \* \* \* \*